United States Patent
Dubrow et al.

(10) Patent No.: US 6,570,590 B1
(45) Date of Patent: May 27, 2003

(54) APPLICATION SHARING IN A FRAME

(75) Inventors: Deborah L. Dubrow, Kirkland, WA (US); Laura J. Butler, Seattle, WA (US); Jane L. Dailey, Seattle, WA (US); Claus T. Giloi, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/413,451

(22) Filed: Oct. 6, 1999

Related U.S. Application Data

(60) Provisional application No. 60/122,429, filed on Mar. 2, 1999.

(51) Int. Cl.[7] .................................................. G09G 5/00

(52) U.S. Cl. ........................ 345/751; 345/753; 345/748

(58) Field of Search ................................. 709/204, 205, 709/206; 345/751, 752, 753, 754, 755, 756, 757, 758, 759, 748, 749

(56) References Cited

U.S. PATENT DOCUMENTS

| | | | |
|---|---|---|---|
| 5,467,264 A | 11/1995 | Rauch et al. .................. 700/12 |
| 5,471,318 A | 11/1995 | Ahuja et al. ................. 358/400 |
| 5,530,795 A | 6/1996 | Wan .............................. 345/759 |
| 5,717,863 A | 2/1998 | Adamson et al. ........... 709/204 |
| 5,717,879 A | 2/1998 | Moran et al. ................ 345/716 |
| 5,727,155 A | * 3/1998 | Dawson ....................... 709/205 |
| 5,758,110 A | * 5/1998 | Boss et al. ................... 345/751 |
| 5,812,534 A | 9/1998 | Davis et al. ................. 370/260 |
| 5,864,711 A | 1/1999 | Mairs et al. .................... 710/6 |
| 5,870,547 A | 2/1999 | Pommier et al. ........... 709/204 |
| 5,874,960 A | * 2/1999 | Mairs et al. ................. 345/733 |
| 5,933,597 A | * 8/1999 | Hogan ......................... 709/204 |

FOREIGN PATENT DOCUMENTS

DE        38 18 087        12/1989

OTHER PUBLICATIONS

Kanellopoulos, D.N. et al. "The Comprehensive Approach of QoS and the Evolution of ACSE Protocols in Multimedia Communications" *Electronics, Circuits and Systems, 1996,* 'ONLINE! vol. 1, Oct. 13–16, 1996, pp. 323–326.

Onmori T et al. "Cooperative Control for Sharing Applications Based on Distributed Multiparty Desktop Conferencing System: Mermaid" *Proceedings of the International Conference on Communications, US, NewYork, IEEE,* vol.–, Jun. 14, 1992, pp. 1069–1075.

"Microsoft NetMeeting 3.0 Resource Kit," Microsoft Corporation, 1999.

(List continued on next page.)

*Primary Examiner*—Ba Huynh
(74) *Attorney, Agent, or Firm*—Leydig, Voit & Mayer, Ltd.

(57) ABSTRACT

User interface for displaying and interacting with images corresponding to applications shared over a computer network in a data conference is described. The described interface provides a user with greater control over the use of a desktop by providing controls for moving and sizing images, including fake windows, corresponding to shared applications by displaying such windows in a frame. The frame is the entity that is manipulated by a user with familiar graphical symbols, or even custom designs, thus avoiding potential complexity in managing control over the images of the shared applications. This user interface facilitates frames that may optionally be semi-transparent or transparent in order to allow a user to keep track of icons and windows covered by the frame. Frames are also useful in reducing network traffic by providing a method for detecting the level of interest of a user in a shared application. Thus, they can be used to modulate the frequency of updating images of shared applications to reflect the need for changes determined by whether the frame is in focus or even closed.

20 Claims, 7 Drawing Sheets

OTHER PUBLICATIONS

R. Schaphorst, "Chapter 7: ITU–T Recommendation H.323 Packet–Based Multimedia Communications Systems," *Videoconferencing and Videotelephony: Technology and Standards*, Boston, Massachusetts, 1999.

"TAPI 3.0 and NetMeeting 2.0," *Microsoft Developer's Network CD*, Microsoft Corporation, Mar. 30, 1999.

R. Schaphorst, "Chapter 10: Multipoint Graphic Communications (T.120)," *Videoconferencing and Videotelephony: Technology and Standards*, Boston, Massachusetts, 1999.

"Understanding Proxy Server," *Microsoft Developer's Network CD*, Microsoft Corporation, 1998.

"Video–Conference Program Allows More Private Face–To–Face Time," Chicago Tribune, May 24, 1999.

"Exchanging Session Keys," *Microsoft Developer's Network CD*, Microsoft Corporation, 1999.

"Chapter 4 Firewall Configuration," *Microsoft Developer's Network CD*, Microsoft Corporation, Apr. 30, 1998.

"Chapter 6 Troubleshooting," *Microsoft Developer's Network CD*, Microsoft Corporation, Apr. 30, 1998.

"Chapter 7 NetMeeting Architecture," *Microsoft Developer's Network CD*, Microsoft Corporation, Apr. 30, 1998.

"Chapter 8 Conferencing Standards," *Microsoft Developer's Network CD*, Microsoft Corporation, Apr. 30, 1998.

"Chapter 9 Product Interoperability," *Microsoft Developer's Network CD*, Microsoft Corporation, Apr. 30, 1998.

A. Krassel et al., "Microsoft's NetMeeting 2.1 COM Interfaces: Understanding How They Work," Microsoft Corporation, [web page], Apr. 10, 1998. http://www.msdn.microsoft.com/workshop/messaging/netmtg/netmtgcom.asp. [Accessed May 18, 1999].

"Text Figures," Microsoft Corporation, [web page], 1999. http://www.microsoft.com/mind/0199/netmeeting/netmeetingtextfigs.htm. [Accessed May 18, 1999].

Microsoft Corporation, "How to Establish NetMeeting Connections Through a Firewall," [web page], revised Oct. 23, 1998. http://support.microsoft.com/support/kb/ARTICLES/Q158/6/23.asp. [Accessed May 18, 1999].

Microsoft Corporation, "How to Create a NetMeeting Hyperlink on a Web Page," [web page], revised Oct. 22, 1998. http://support.microsoft.com/support/kb/ARTICLES/Q157/2/77.asp. [Accessed May 18, 1999].

Microsoft Corporation, "How to Share Programs with NetMeeting," [web page], revised Oct. 27, 1998. http://support.microsoft.com/support/kb/ARTICLES/Q154/3/54.asp. [Accessed May 18, 1999].

Microsoft Corporation, "How to Make a Video Call with NetMeeting," [web page], revised Oct. 27, 1998. http://support.microsoft.com/support/kb/ARTICLES/Q167/7/78.asp. [Accessed May 18, 1999].

Microsoft Corporation, "How to Start NetMeeting Conference from a Command Line," [web page], revised Oct. 27, 1998. http://support.microsoft.com/support/kb/ARTICLES/Q167/0/97.asp. [Accessed May 18, 1999].

Microsoft Corporation, "How to Use Whiteboard in Microsoft NetMeeting," [web page], revised Oct. 27, 1998. http://support.microsoft.com/support/kb/ARTICLES/Q154/3/10.asp. [Accessed May 18, 1999].

White Pine, "CU–SeeMe Pro Will Improve Communication and Collaboration," [web page], 1999. http://www.wpine.com/Products/CU–SeeMe–Pro/cu–pro–business–features.html. [Accessed May 19, 1999].

White Pine, "All New CU–SeeMe Pro–Changing the Face of Communication!," [web page], 1999. http://www.wpine.com/Products/CU–SeeMe–Pro/index.html. [Accessed May 19, 1999].

DataBeam, "DataBeam Meeting Tools!," [web page], 1999. http://www.databeam.com/meetingtools/info.html. [Accessed May 19, 1999].

IMTC, "IMTC Search: H.245," [web page], 1999. http://www.imtc.org/cgi–bin/query.cgi. [Accessed May 11, 1999].

IMTC, "H.323 Overview, " [web page], 1999. http://www.imtc.org/h323body.htm. [Accessed May 11, 1999].

IMTC, "Frequently Asked Questions," [web page], 1999. http://www.imtc.org/faqbody.htm. [Accessed May 11, 1999].

IMTC, "H.320 Overview," [web page], 1999. http://www.imtc.org/h320body.htm. [Accessed May 11, 1999].

IMTC, "T.120 Overview," [web page], 1999. http://www.imtc.org/t120body.htm. [Accessed Jun. 17, 1999].

"NetMeeting 3 Beta," [web page], Updated Mar. 23, 1998. http://www.microsoft.com/netmeeting/Beta30.htm. [Accessed May 7, 1999].

A. Krassel et al., "Microsoft NetMeeting 2.1 COM Interfaces: Understanding How They Work," [web page], Microsoft Corporation, Apr. 10, 1998. http://msdn.microsoft.com/library/techart/msdn_netmtgcom.htm. [Accessed May 4, 1999].

Don Anderson, "Overview of the IEEE 1394 Architecture," *Fire Wire System Architecture: 2nd Edition*, MindShare, Inc., Addison–Wesley: Reading, Massachusetts, pp. 19–34, (1999).

"Secure Networking Using Microsoft Windows NT 5.0 Distributed Security Services," *Microsoft Developer's Network CD*, Microsoft Corporation, 1999.

Microsoft Corporation, "Microsoft Certificate Server," [web page], Apr. 17, 1997. http://msdn.microsoft.com/workshop/security/client/certsvr.asp. [Accessed May 20, 1999].

Microsoft Corporation, "Windows NT E3/F–C2 Evaluations," [web page], Apr. 28, 1999. http://www.microsoft.com/security/issues/e3fc2summary.asp. [Accessed May 4, 2000].

Microsoft Corporation, "Secure Sockets Layer/Transport Layer Security," [web page], Oct. 8, 1998. http://www.microsoft.com/security/tech/ssl/default.asp. [Accessed May 21, 1999].

Microsoft Corporation, "How to Parse a Certificate Using Active Server Pages (ASP)," [web page], Updated Dec. 1996. http://msdn.microsoft.com/workshop/security/client/parse.asp. [Accessed May 20, 1999].

Microsoft Corporation, "Securing Data Transmissions with Secure Sockets Layer (SSL)," [web page], Updated Dec. 1996. http://msdn.microsoft.com/workshop/security/client/iis_ssl.asp. [Accessed May 20, 1999].

Netscape Communications Corporation, "How SSL Works," [web page], 1999. http://developer.netscape.com/tech/security/ssl/howitworks.html. [Accessed Nov. 16, 1999].

VeriSign, Inc., "Encryption and Digital Certificates," [web page], 1999. http://www.verisign.com/whitepaper/enterprise/overview/page2.html. [Accessed Nov. 16, 1999].

Netscape, "How Digital Certificates Work," [web page], 1999. http://www.netscape.com/security/techbriefs/certificates/howcerts.html. [Accessed Nov. 16, 1999].

Netscape Communications Corporation, "Enterprise–Ready, Open Standards–Based Email Security," [web page], 1999. http://developer.netscape.com/tech/security/email/smime.html. [Accessed Nov. 16, 1999].

Netscape, "How Personal Certificates Work," [web page], 1999. http://www.netscape.com/security/techbriefs/personalcerts/how.html. [Accessed Nov. 16, 1999].

Netscape, "Personal Certificates," [web page], 1999. http://www.netscape.com/security/techbriefs/personalcerts/index.html. [Accessed Nov. 16, 1999].

Keith Brown, "Security Briefs," *Microsoft Developer's Network CD*, Microsoft Corporation, Feb. 1999.

"PFX: Personal Information Exchange Syntax and Protocol Standard," *Microsoft Developer's Network CD*, Microsoft Corporation, Jan. 27, 1997.

J. Benaloh et al., "The Private Communication Technology (PCT) Protocol," *Microsoft Developer's Network CD*, Internet Draft, Microsoft Corporation, Oct. 1995.

"What's New in the NetMeeting Resource Kit Wizard," *Microsoft Developer's Network CD: Microsoft NetMeeting*, Microsoft Corporation, Apr. 1999.

"First–Time Users," *Microsoft Developer's Network CD: Microsoft NetMeeting*, Microsoft Corporation, Apr. 1999.

"Before the Meeting Starts," *Microsoft Developer's Network CD: Microsoft NetMeeting*, Microsoft Corporation, Apr. 1999.

"During the Meeting," *Microsoft Developer's Network CD: Microsoft NetMeeting*, Microsoft Corporation, Apr. 1999.

"Troubleshooting Tips," *Microsoft Developer's Network CD: Microsoft NetMeeting*, Microsoft Corporation, Apr. 1999.

"Glossary," *Microsoft Developer's Network CD: Microsoft NetMeeting*, Microsoft Corporation, Apr. 1999.

"NetMeeting 2.1 Features," [web page], Microsoft Corporation, Update Jan. 5, 1998. http://www.microsoft.com/netmeeting/features/main.htm. [Accessed May 4, 1999].

Microsoft Corporation, "Microsoft NetMeeting 2.0: Overview and Frequently Asked Questions," [web page], Updated Jul. 15, 1997. http://msdn.microsoft.com/library/backgrnd/html/msdn_netmofaq.htm. [Accessed May 4, 1999].

"Microsoft NetMeeting 3.0 Resource Kit," Microsoft Corporation, 1999.

DataBeam, "A Primer on the T.120 Series Standard," [web page], 1999. http://www.databeam.com/ccts/t120primer.html. [Accessed May 4, 1999].

* cited by examiner

APPLICATION SHARING IN A FRAME

This application claims priority from the provisional application No. 60/122,429 filed on Mar. 2, 1999. Other applications related to this application are application Ser. No. 09/515,767 filed on Mar. 1, 2000, application Ser. No. 09/515,762 filed on Mar. 1, 2000, application Ser. No. 09/395,508 filed on Sep. 14, 1999 and application Ser. No. 09/395,480 filed on Sep. 14, 1999.

TECHNICAL FIELD

This invention relates generally to distributed computing involving multiple users, possibly with their own computers connected to networks, including the Internet, Intranet, LAN or WAN. More particularly, the field is that of data-conferencing and application sharing between users connected to a network and even more particularly of providing efficient and user friendly user interfaces that allow users greater control over their work.

BACKGROUND OF THE INVENTION

The growth in the number and sophistication of computers and their users has made possible not only new uses but also demand for user friendly applications to perform complex tasks in an intuitive and seamless fashion. Thus, computer users are increasingly demanding and expecting software that permits a variety of tasks to be performed on the same computer without the need for extensive training and time/resource investments.

Many business and personal tasks involve interacting with other people and entities, often using the Internet or a local network. Such tasks may involve communication via email, and increasingly, audio/video/data connections over computer networks along with the ability to operate computers or applications remotely. Unsurprisingly, the market for audio/video conferencing products has grown considerably to about 39 billion dollars annually. In an increasingly interconnected world, data conferencing in the form of application sharing not only substitutes for the need to travel, but allows a traveler to retain limited use of familiar software by permitting remote operation.

Furthermore, many projects, such as software development, computer aided design ("CAD") and even instruction via remote classes hosted on the web benefit from the ability to not merely talk or see other participants, but also observe an application being executed by a user and, optionally, acquire control of the application. Several collaborators may work on the same document or design at the same time without physically being present in the same room. The participants can examine each other's work and contribute their opinion and modifications.

It is conceivable that many beta and even trial versions of software may be made available to potential users via a remote connection, thus obviating the need for downloading several Megabytes of code while permitting the software owner to retain control of the program code. It should be noted that the benefits are mutual. Users may obtain the look and feel of an application, even on data of their choosing, without having to worry about uninstalling the program if it is not satisfactory. For instance, a genealogy program vendor may invite potential buyers or customers to use a program and its associated database without giving away proprietary information. And, there are many more productive uses possible for software that permits remote sharing of applications.

Application sharing involves transfer of significant data, including input and output data for the shared application, accurately across networks. To this end standards have been developed to facilitate data transfer across networks comprising a variety of hardware and software packages. A standard of particular significance for data conferencing, due to its popularity, is the T.120 standard. The T.120 family of standards is compatible with applications using the H.323 set of standards that permit audio and video signals to be shared in addition to data conferencing. Consequently, the packet-based H.323 standards are expected to be the next generation of conferencing standards. Thus, a H.323 based connection may be established which allows data transfer in compliance with the T.120 standard while the connections are negotiated using H.323 protocols. The greater need for error free transmission of data is met by the use of the transmission control protocol ("TCP") by the T.120 suite of standards for data conferencing, thus ensuring error free transfer of instructions, program outputs and data.

Appropriate standards facilitate interoperability of applications, but equally important is the user interface for effective and efficient use of applications utilizing the standards. Many vendors, such as "MICROSOFT", "WHITE PINE" and many others, supply conferencing products that have generated some experience with user interfaces. In addition, some products, such as "PCANYWHERE" and "TIMBUKTU" allow for controlling other computers.

Some of these software products allow a remote user to assume complete control of another computer's desktop. In such a situation the mouse movements and other operations on the controlling computer are reflected on the controlled, i.e. client, computer. The controlled computer may not have any control over its desktop, in which case it merely executes instructions from the controlling computer. Another flavor of this situation occurs when an application is being shared across a network. For example, a host may launch an application for sharing with multiple conference participants. Thus, a document being drafted by a team may appear on the screens of the members of the drafting team due to the sharing of the document processing application by the host. The controlling computer, usually the host's computer, controls a window corresponding to the shared application on the desktop of an end user's computer, i.e., the machine with which the host shares the application. Consequently, operations on the controlling computer are reflected on the controlled computer, and, in particular, changes made to the window.

The position of this window, which is actually a fake window, relative to the desktop of each team member's computer is the same as that on the controlling computer's desktop. While many control symbols appear in this window, only the controlling user may operate these symbols. This is a limitation placed by the need to avoid conflicts due to different users attempting disparate operations. Consequently, such a window is a 'fake window' since it cannot be manipulated like the familiar window that many users have come to know and love/hate.

Many vendors, e.g., "MICROSOFT®" and its "NET-MEETING®" integrated suite of conferencing software, offer application sharing along with audio/video/data conferencing and various levels of security, access, and multi-tasking. Conferences compatible with such suites can be accessed by a web-browser if the conference utilizes appropriate server software packages for conference multi-casting. Multi-casting refers to the ability to transmit data to many users simultaneously in a manner similar to broadcasting, but with some control over the intended target audience.

Despite the size of the current market for application sharing products there are many problems that limit the usefulness of such products. Current products for application sharing effectively create a master user, the host, who is executing an application of interest and, in effect, depriving the user of the controlled machine, at least partial use, and possibly, any independent use of the computer desktop. It should be noted that it is not necessary to host the meeting, e.g., in a T.120 sense, in order to initiate application sharing. Anyone in the conference can share an application. In the application-sharing context, in contrast to the T.120 context, the host is the person initiating the application sharing, and not necessarily the host of the entire conference.

Thus, the controlled user cannot control the size or position of the fake window of the fake window covering icons and useful areas of the desktop. IN fact no user can can control the size or position of the fake windows. Furthermore, application sharing software does not account for the different kinds of monitors and resolution, thus creating the possibility of even occupying the entire viewable area with a single application frame. A host with a large desktop may share applications that may not even be visible on a smaller desktop on account of being off-screen. Consequently, there is considerable potential for confusion when there are several applications being shared because not all applications may be shared by the same set of users. Some application fake windows may, partially or completely, cover up fake or real windows belonging to other shared applications. Furthermore, locating a particular window of interest is difficult in a jungle of fake windows.

The use of fake windows in application sharing software renders many familiar graphical symbols non-operational resulting in an unfriendly and intimidating interaction for less experienced users. There are additional consequences flowing from the use of fake windows. The need to update multiple application windows each time an operation is performed in the controlling window results in considerable network traffic. This can lead to significant delay in system response as the computer waits for adequate updates to the fake window to complete regardless of the interest of the user. Thus, application sharing software presents many problems when multiple applications are being shared by a diverse set of users.

SUMMARY OF THE INVENTION

The invention described herein overcomes these shortcomings in the art and provides many additional benefits. The invention displays the shared window, viz., the shadow window corresponding to the shared application, in a separate frame, which is displayed on another user's desktop. This frame may be provided with suitable controls for moving the frame relative to the desktop and even minimize or resize it. Thus, mouse movements and other operations from the host's desktop can be reflected in the frame on the client desktop as a function of the frame boundaries. The use of the frame also makes it possible to reduce unnecessary network traffic by updating frames that are not in focus less frequently. Consequently, the user interface is made user-friendly and responds with significantly smaller delays.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner understood by those possessing ordinary skill in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 1:
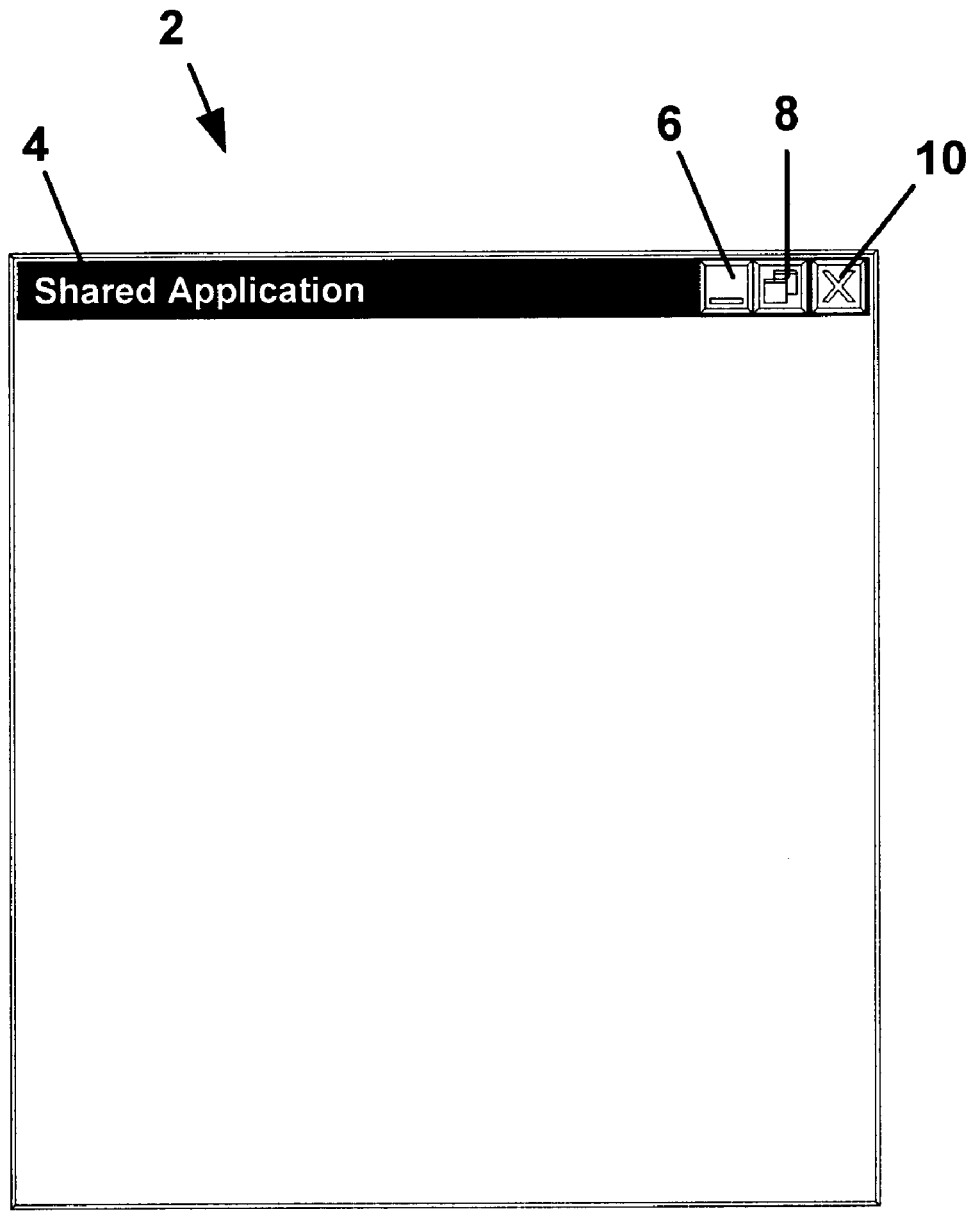
FIG. 1 is a representation of a fake window corresponding to a shared application, and lacking actually functional graphical symbols.

Turning to the drawings, wherein like reference numerals refer to like elements, the invention is illustrated as being implemented in a suitable computing environment. The fake window created on a display due to a shared application is illustrated in FIG. 1. The fake window 2 has a title bar 4, a non-functional button 6 resembling a button for minimizing window 2, a non-functional button 8 resembling a button for changing the size of window 2, and a non-functional button 10 resembling a button for closing window 2. Window 2 is not controllable by the user unless the user gets control of the application being shared. Buttons 6, 8 and 10, described as being non-functional become functional if the user has control of the shared application.

Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 2:
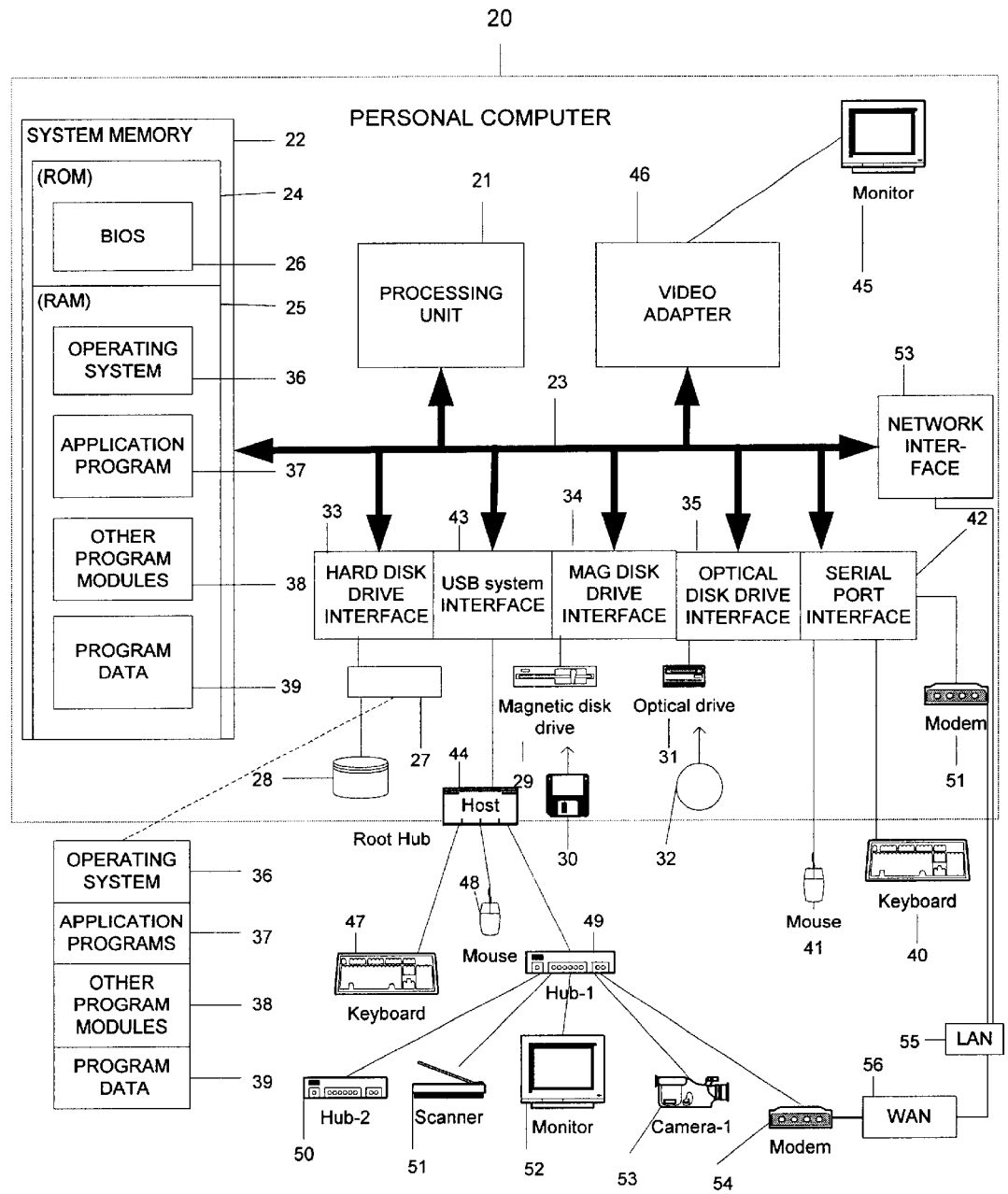
FIG. 2 is a block diagram generally illustrating an exemplary computer system on which the present invention resides.

With reference to FIG. 2, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 may further include a hard disk drive 27 for reading from and writing to a hard disk 28, a magnetic disk drive 29 for reading from or writing to a removable magnetic disk 30, and an optical disk drive 31 for reading from or writing to a removable optical disk 32 such as a CD ROM or other optical media.

The hard disk drive 27, magnetic disk drive 29, and optical disk drive 31 are connected to the system bus 23 by a hard disk drive interface 33, a magnetic disk drive interface 34, and an optical disk drive interface 35, respectively. The drives and their associated computer-readable media provide nonvolatile storage of computer readable instructions, data structures, program modules and other data for the personal computer 20. Although the exemplary environment described herein employs a hard disk 28, a removable magnetic disk 30, and a removable optical disk 32, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 28, magnetic disk 30, optical disk 32, ROM 24 or RAM 25, including an operating system 36, one or more applications programs 37, other program modules 38, and program data 39. A user may enter commands and information into the personal computer 20 through input devices such as a keyboard 40 and a pointing device 41. Other input devices (not shown) may include a microphone, joystick, game pad, satellite dish, scanner, or the like. These and other input devices are often connected to the processing unit 21 through a serial port interface 42 that is coupled to the system bus. Increasingly, such devices are being connected by the next generation of interfaces, such as a universal serial bus (USB) 43 with a root hub/Host 44, and to which other hubs and devices may be connected. Other interfaces that may be used include parallel ports, game ports, and the IEEE 1394 specification. A monitor 45 or other type of display device is also connected to the system bus 23 via an interface, such as a video adapter 46. In addition to the monitor, personal computers typically include other peripheral output devices.

The USB connections illustrate its utility. A keyboard 47, a pointing device 48 and another hub, hub-1 49, are connected to the root hub/Host 44. Hub-1 49 is further connected to another hub, hub-2, 50, scanner 51, monitor 52, camera-1 53, and modem 54. It should be understood that additional cameras and devices may be directly connected to the computer instead of a USB. Thus, the system depicted is capable of communicating with a network and sending/receiving audio, video and data.

The personal computer 20 may operate in a networked environment using logical connections to one or more remote computers. The types of connections between networked devices include dial up modems, e.g. modem 51 may be directly used to connect to another modem, ISDN, xDSL, cable modems, wireless and include connections spanning users connected to the Internet. The remote computer may be another personal computer, a server, a router, a network PC, a peer device or other common network node, and typically includes many or all of the elements described above relative to the personal computer 20 in FIG. 2. The logical connections depicted in FIG. 2 include a local area network LAN 55 and a wide area network WAN 56. Such networking environments are commonplace in offices, enterprise-wide computer networks, intranets and the Internet.

When used in a LAN networking environment, the personal computer 20 is connected to the local network 55 through a network interface or adapter 53. When used in a WAN networking environment, the person computer 20 typically includes a modem 51 and/or modem 54 or other means for establishing communications over the WAN 52. Modem 51, which may be internal or external, is connected to the system bus 23. It will be appreciated that the network connections shown are exemplary and other means of establishing a communications link between the computers may be used, e.g., from a LAN gateway to WAN.

In secure conferences it is useful to designate a host who is responsible for ensuring security, admission criteria, tracking participants, and, possibly even control communications. In addition, it would be desirable that the conference be compatible with a variety of computer systems and networking protocols. The T.120 specifications, accepted internationally, permit conferences to be setup between clearly identified participants. A master host, termed the Top Provider (TP), maintains a dynamically updated database of participants in the conference.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware or more than one software module.

A preferred embodiment of many aspects of the invention described herein is the "NETMEETING" brand conferencing software package, available in versions 3.0 and above, manufactured by "MICROSOFT" Corporation of Redmond, Wash. USA. Not all possible advantages enabled by the invention are included in a single embodiment. Features and many additional uses of the invention will become clear in the following description of some of the possible embodiments.

In accordance with the invention, a user interface that greatly expands the use of a Graphical User Interface (GUI) desktop being used to display information corresponding to applications being shared over a network is described here. The user interface gives a user greater control over the desktop display than what is presently available. One of the implementations of a GUI interface is the use of a pointing device such as a mouse. In accordance with a GUI, the area corresponding to the desktop is divided into areas that are meaningful in the handling of events generated as a consequence of an image corresponding to the pointing device being in a given area and the clicking one or more buttons. The GUI interface makes possible the familiar desktop with icons used to launch programs, close applications and the like with a click of the mouse or other pointing device. The GUI user interface also makes consistent use of graphical symbols for familiar operations. Examples of such operations include clicking buttons, menus, dropdown lists, minimizing, maximizing, restoring and using containers or frames to display related information, such as that relating to the same application.

Figure 3:
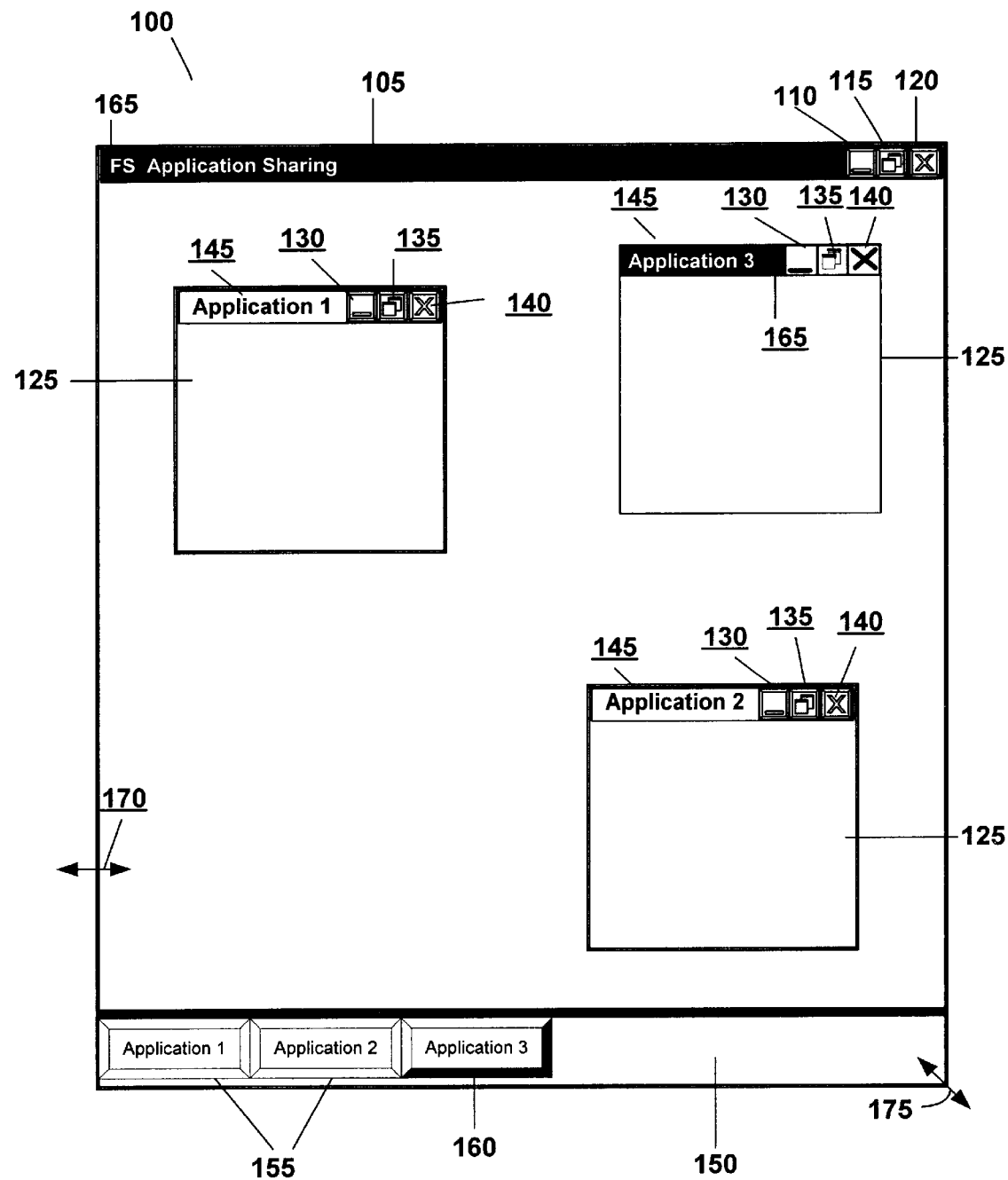
FIG. 3 illustrates a schematic of a frame with familiar graphical symbols and three windows corresponding to three shared applications.

FIG. 3 illustrates schematics of some commonly used graphical symbols in user interfaces (UI) in a sample frame 100 with three application fake windows. While frame 100 is depicted as having a conventional shape, it should be understood that the precise outline can be varied. Frame 100 has a status bar 105 and three commonly used control buttons. The control button 110 is a toggle button. Clicking on button 110 minimizes frame 100 and clicking on the minimized representation of the minimized frame brings it back to life, i.e., maximizes it. Of course, applications contained in the frame are not terminated, but merely out of sight. Control button 115 is a toggle button that switches the window between full size and a reduced size, while control button 120 closes the frame, and in some embodiments, could indicate the end of sharing applications with a host corresponding to the frame. All of the applications shared by a particular host, preferably, appear in a single frame.

The sharing of applications in a single frame is logical because the frame can reflect the boundaries of a common desktop and the position of shared application windows within it. If the frame size is small then it may be possible to enable scroll bars in the frame. And, in some embodiments it may be preferable to represent each shared application in its own frame, particularly when the host may have multiple or peculiar sized desktops. Alternatively, in embodiments where updating information is sensitively tied to applications actually being viewed it might be preferable to provide a frame for each shared application. It is also possible to place applications shared by hosts belonging to a group in a single frame, possibly as an option to be exercised by a user, i.e. owner of the desktop on which the frame resides. In other words, the owner of the desktop may, in some embodiments, assign fake windows to a frame in lieu of the entire desktop.

Within the frame 100 three fake application windows 125 are shown, each with control button 130 for minimizing, toggle button 135 for restoring and button 140 for closing a particular window. Of course, none of these control buttons are operational unless the user acquires control of the shared application. In addition, it may be preferable, in some embodiments, to hide the non-functional buttons. Thus, the buttons would be displayed only if control passes to the desktop owner. Moreover, in some embodiments the host may be only be able to give up control of the entire frame while in other embodiments, the host may transfer control over a particular application.

Each of the fake windows also has a status bar 145 displaying an identifier. At the bottom of the frame 100 is a task bar 150 on which are placed buttons 155 and 160. The state of the buttons 155 and 160 indicates the status of the applications corresponding to them. Button 160 is distinguished from buttons 155 to indicate that application 3 is in focus, which is also reflected in the darker color 165 of the status bar 145 of the fake window 125 corresponding to application 3. In addition to these graphical symbols, each of the fake windows can be expected to have menu bars and other accouterments of a graphical user interface not shown in FIG. 3.

In addition, some of the familiar and useful, although optional, graphical facilities present in GUIs are also illustrated in FIG. 3. Arrows 170 and 175 represent the ability provided to a user to use a pointing device to resize the frame 100 by pointing at the border of frame 100. Arrow 170 illustrates the ability to change the width of the frame while arrow 175, positioned at a corner illustrates the ability to resize both the height and width of the frame 100 in a correlated fashion. While it is customary to provide such functionality, some embodiments may elect to not provide the abilities represented by arrows 170 and 175.

The fake taskbar 150 at the bottom of the frame is of particular significance since it is different in its functionality from the familiar taskbar on a desktop. As is known to many users and those of skill in the art, the taskbar provides access to basic control functions on the desktop. Thus, if the fake taskbar was really a reflection of the host taskbar there would be potential for a user to assume control of the hosts's computer and, e.g., shut it down by accessing the START button and other control symbols. Even if the control symbols were not displayed on the fake taskbar, inadvertent clicking of the pointing device, usually a mouse, in undesirable areas of the taskbar could possibly result in conflicts and contests—in other words complexity. The fake taskbar 150 only shows the status of the applications being shared in a particular frame. In alternative embodiments, fake taskbars may be used so that they correspond to a particular group of applications, or a group of hosts and other similar variations with not loss in generality. An important purpose for providing a fake taskbar remains to avoid the potential for conflicts with events handled in the context of the regular taskbar of the host.

Figure 4:
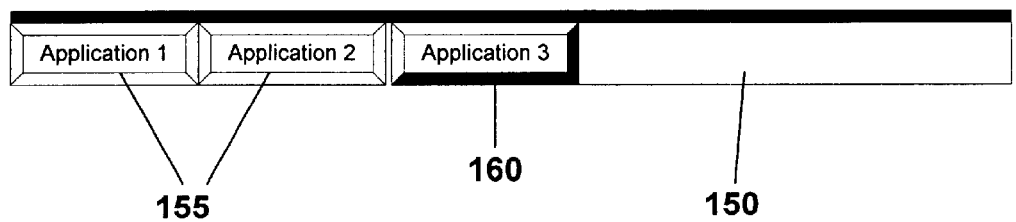
FIG. 4 illustrates a fake taskbar.

FIG. 4 illustrates a fake taskbar the way it might be displayed on the host's desktop, possibly inside the frame. It is to be understood that the precise design of the taskbar and the frame may vary considerably. The functionality illustrated in the embodiments described here includes the ability to minimize the frame without manipulating the fake windows inside, the ability to resize the frame and even close the frame. Some embodiments may provide only some of these controls while other embodiments may add controls made possible by the use of the frame to contain the shared applications.

In addition, the frame may be provided with a transparent or partially transparent background to ensure that desktop applications covered by the frame are only obscured by the shared windows on a client desktop rather than the entire frame. The graphics are generated by compositing overlapping images to create the actual view displayed. Often, multiple colors and transparency values can be specified. For instance, primary colors such as Red, Green and Blue along with a transparency value α, ranging from 0 to 1, may be specified for an image. In many implementations, the color values may be stored with α already factored in to save on processing time.

In the case of a frame it may be advantageous to set α to 0 for the background of the frame to allow underlying images to be visible while α for the control buttons, borders and fake windows may continue to be set to 1, thus making them opaque. Intermediate values for α would result in a superposition, usually allowing faded version of the underlying image to show through. Such modifications help a user keep track of desktop icons and help in deciding when and where to move the frame. Controls for moving the frame may be provided in a button 165 in FIG. 3, as is conventional or in a dedicated button. Similarly, the conventional buttons 115, 120 and 125 described earlier may be modified in their appearance or position with no loss of generality.

Figure 5:
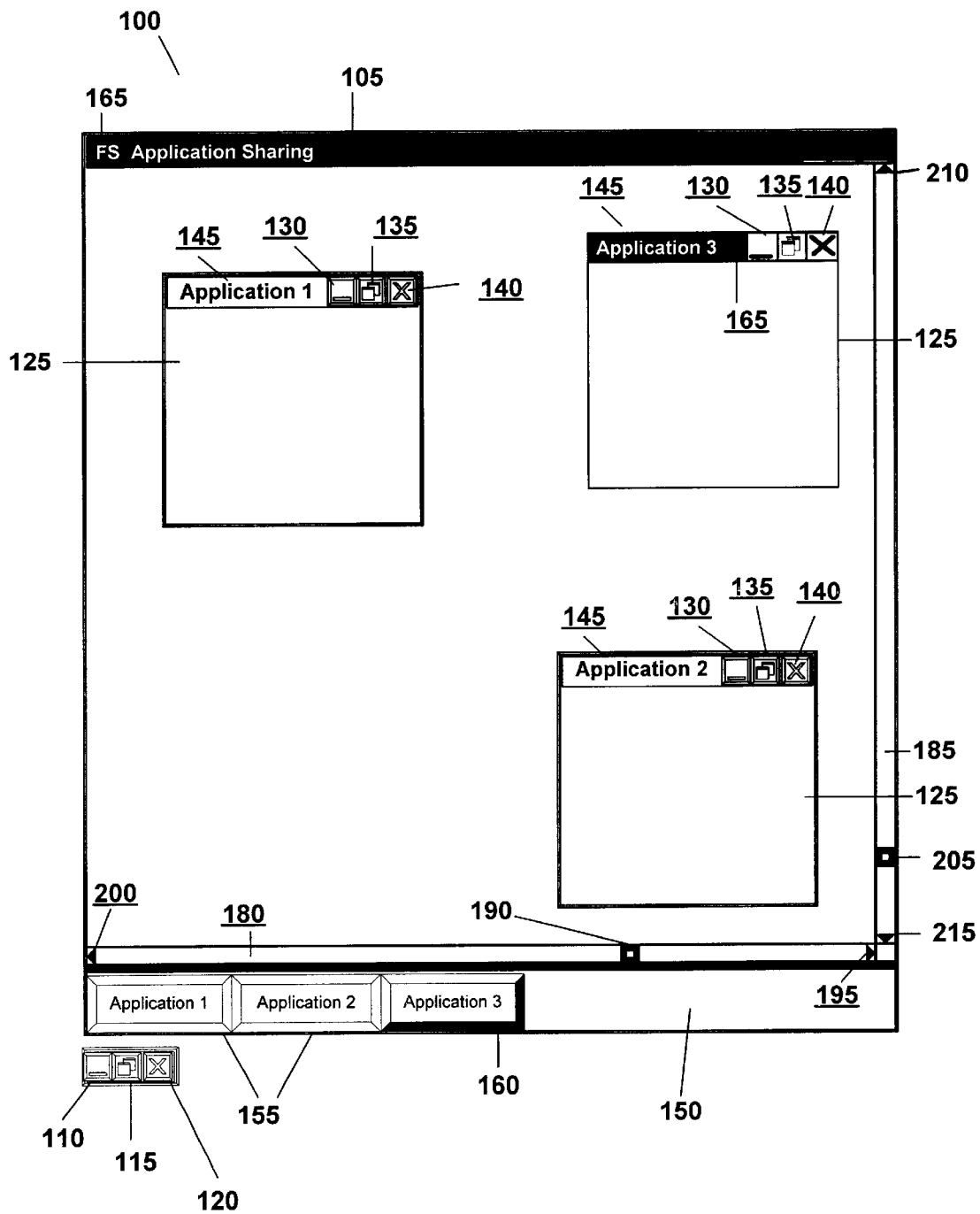
FIG. 5 illustrates another schematic of a frame, containing fake windows corresponding to shared applications, with many graphical controls placed outside the frame containing the fake windows.

Other embodiments may use different shapes for the frame and even place the control buttons outside of the frame boundaries. One such arrangement is illustrated in FIG. 5 where the numerals have the same meaning as in FIG. 3. Note that the control buttons 110, 115 and 120 are outside of the frame boundaries. Thus the decision to move, resize or minimize the frame has significance only for the client who owns the desktop on which the frame with its fake windows is displayed.

Referring to FIGS. 3 and 5, attention is drawn to the logo, "FS" 165 in the upper left corner of the frame. Traditionally, this location displays a logo that may be clicked to access a menu to move, minimize, resize, restore or expand the relevant frame. Similar functionality is possible in the context of frames containing shared windows.

FIG. 5 further illustrates additional optional graphical controls. These controls may be available in some embodiments and may be invoked when needed since they allow functionality to display a large area inside a smaller frame by permitting scrolling operations. Optional scroll bars 180 and 185 allow the frame 100 to display areas larger than the area enclosed by the frame 100. Scroll bar 180 has a button 190 which may be dragged or, alternatively, arrows 195 and 200 may be clicked to effect changes in the display inside the frame 100 in a manner familiar to most users. Similarly, scroll bar 185 has a button 205 and arrows 210 and 215. Naturally, it should be understood that not all embodiments have to provide such functionality.

While, not all of the functionality made possible by the use of frames is relevant in each embodiment, the user interface described here makes it possible to efficiently update frames and applications. The use of a frame permits embodiments to further optimize the rate at which updating of the frames is carried out by providing a marker for the kind of interaction a client is having with shared applications in a frame. For instance, in some embodiments, the shared application windows may be updated depending on the degree of interest discerned from the state of the frame. Thus, minimized frames or out of focus frames do not need to be updated quite as frequently as frames that are in focus. Frames that have been closed, in embodiments supporting such a function, may be updated at the lowest possible frequency due to the degree of no interest detected from the state of the frame. On the other hand, additional decisions have to be made about updating each frame as opposed to a general broadcast to all client computers sharing an application in utilizing the information provided by the state of the frame. The extra complexity may be worth the effort if bandwidth is really at a premium. Thus, the response time of shared applications, as a whole, can be improved by modifying the frequency and nature of updates in some embodiments.

Figure 6:
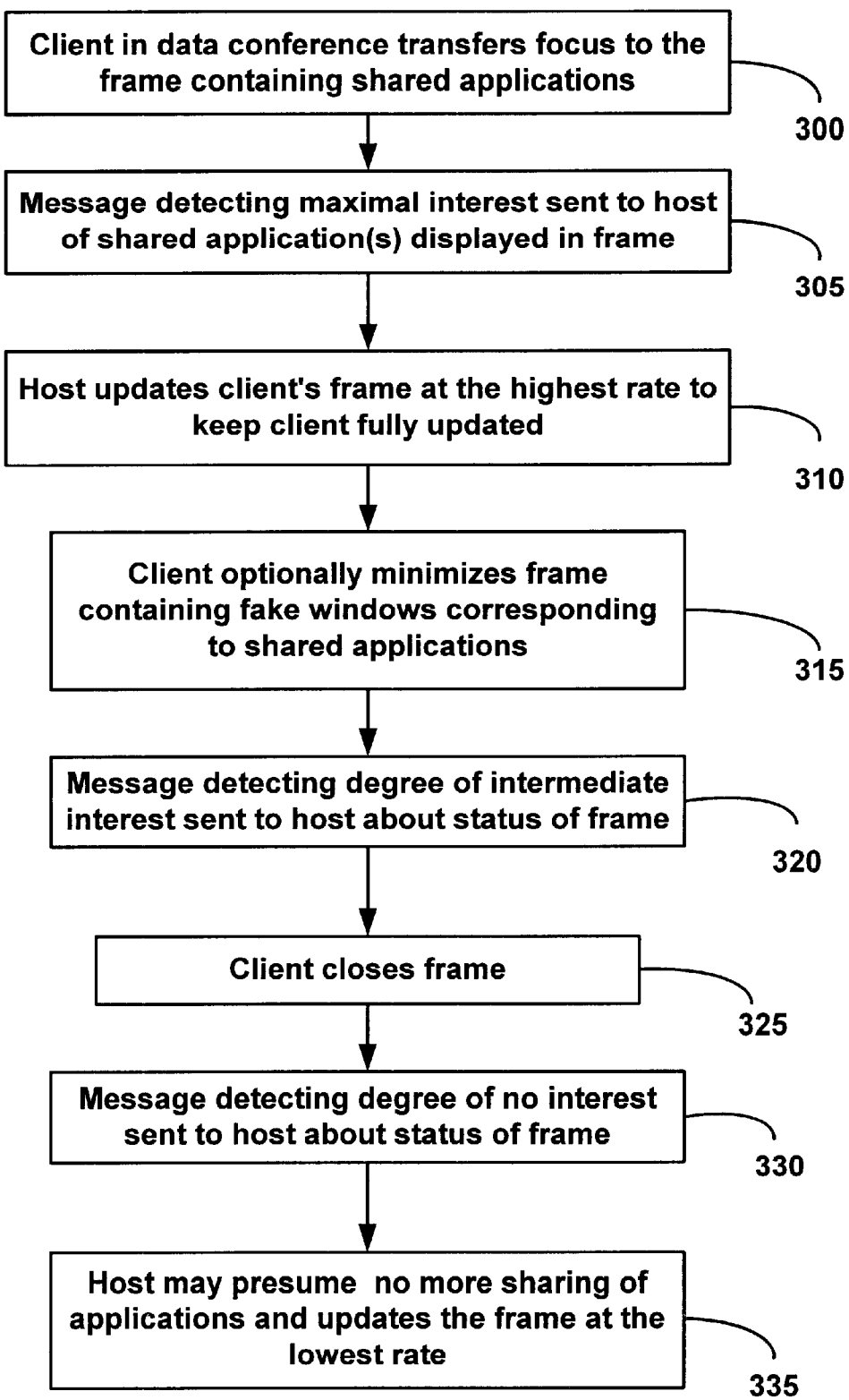
FIG. 6 illustrates another use of frames on client desktops to judge a particular client's interest in the application windows displayed in a given frame and accordingly modulate updates to reduce the network traffic and make the system more responsive.

FIG. 6 illustrates a possible network traffic modulating embodiment of the invention. A client in a data conference transfers focus to a frame (step 300) indicating a degree of maximal interest, which is detected and communicated to the host (step 305). The host responds by updating the frame at a rate to ensure that the client is fully updated (step 310). If the client minimizes the frame or transfers focus from the frame (step 315), a message indicating a degree of intermediate interest is sent to the host (step 320). This may be expected to result in a lower rate of updates from the host. The client closes the frame (step 325), a possibility that may not be present in all implementations of the invention. A message indicating a degree of minimal interest is sent to the host who may even presume a degree of no interest and send the minimal updates to the client, i.e., at the lowest rate. It should be noted, however, that often bandwidth and response times are not at a sufficient premium to justify the extra overhead in modulating the frequency of updates, and instead, a general broadcasting strategy is likely to be employed.

When a client is in control of a shared application, only changes made to the shared application window need be transmitted to the host, who may, in turn, transfer them to other clients. In some embodiments where speed is of the essence, information may be transmitted directly to other client desktops.

In addition, It should be noted that the shared taskbar can have dual functionality. Buttons on the shared fake taskbar reflect the state of the applications in the frame. Thus, the state of the fake taskbar is communicated across the network in general. However, it is possible to implement the fake taskbar distinct from the frame to reflect the state of the frame as a whole, which is a client specific effect. Such a taskbar may be present in addition to the regular taskbar, and preferably reflect the state of more than one frame. All events corresponding to such a fake taskbar need not be transmitted to other users.

The use of frames also allows a client to share several applications with different hosts, and thus have many corresponding frames on a desktop. The ability to move frames around the desktop, or minimize selected frames, and focus on selected frames significantly reduces the clutter while retaining the convenience of sharing many applications and boost productivity.

When a host is sharing an application with several clients, it is useful to transfer control of the application to a particular client to really make the conferencing experience useful. If several clients request control then a contest may result. And transferring control automatically could result in systemic instability with many transfers of control. A preferred embodiment of the invention provides for a display of a control-request-message corresponding to one of several requests, possibly selected at random between simultaneous requests, on the display device of the host and/or the current person in control of the shared application. Other requests for control while the control-request-message is being displayed are unsuccessful as intimated by a message such as a pop-up box or a busy signal. The display of the control-request-message is timed out with a denial of the request in the event no action is taken by the person in control.

Figure 7:
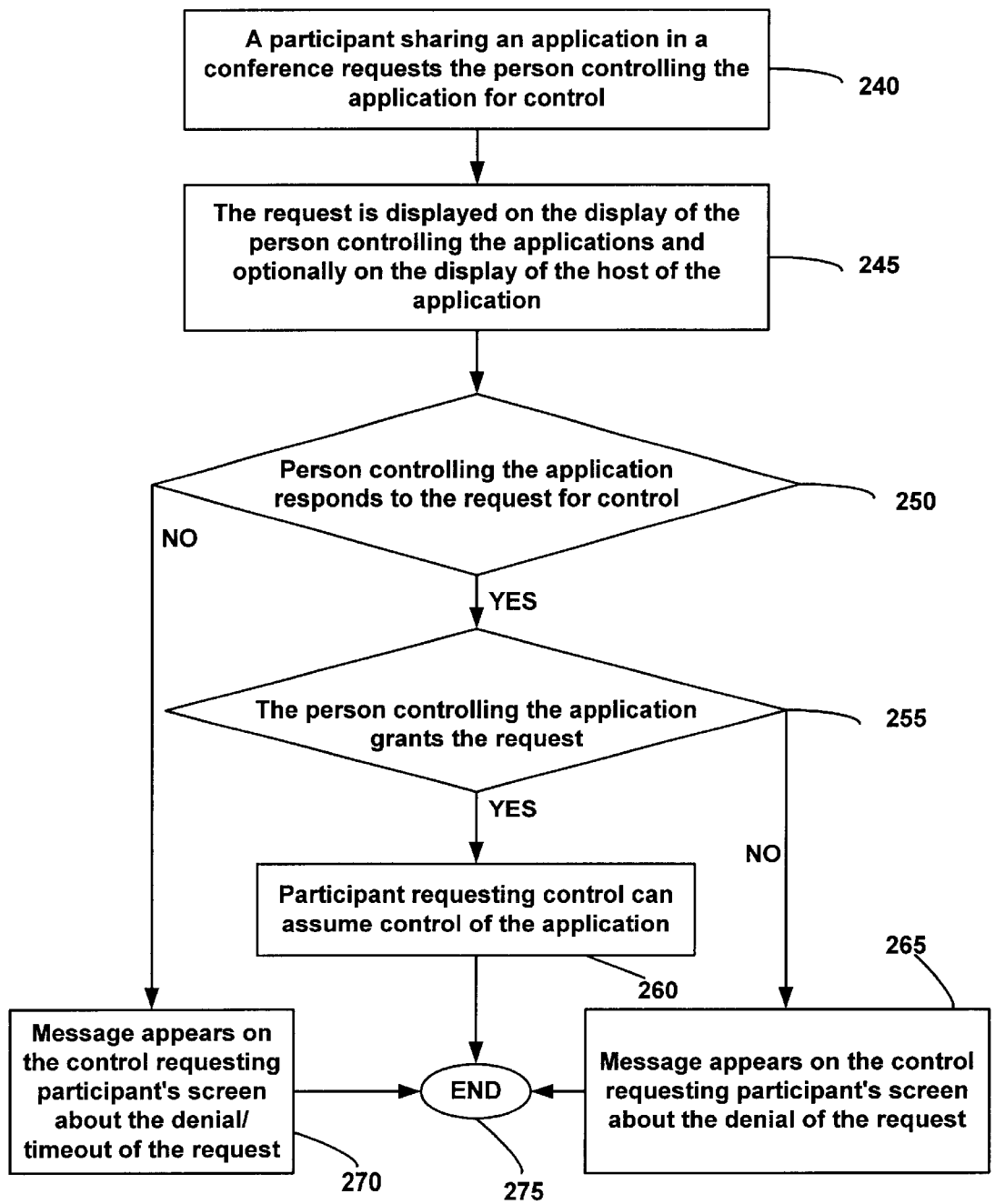
FIG. 7 illustrates a user interface for managing transfer of control over a shared application between several parties requesting such control.

FIG. 7 illustrates an embodiment with a user interface, in accordance with the invention, for transferring control between applications. At step 240 a participant in a conference where an application is being shared requests control of the application. Control may be requested, preferably from the person controlling the application at that time, although in some embodiments the host of the application may be a necessary intermediary. At step 245, the request is displayed on the screen of the appropriate person, possibly in a pop-box or may even be rendered in other formats such as an audio signal. At step 250 the person in control of the application decides whether to respond to the request. If the person responds to the request, then at step 255 a decision has to be made whether to grant the request and cede control of the application or to deny the request. If control is ceded then at step 260 the participant requesting control assumes control. On the other hand, if the request is denied at step 255, a message appears to inform the control seeker that the request has been denied. If the person in control does not respond to the request then at step 270 the request times out and a message may be displayed to inform the requester that not response could be elicited. At step 275, all possible outcomes flowing from the request have been resolved.

This aspect of the user interface allows for effective control over the application-sharing environment. The host may exercise even greater control by being able to wrest control by executing a selected set of key strokes or pointing device movements. The overall effect of these changes to the user interface is in better management of the application-sharing environment with users being able to effectively participate but not sabotage the experience. The users retain greater control over their own machines while they may exercise only limited control over other machines. And, the user interface described herein makes possible better management of network traffic, which in turn translates into a faster and more responsive user interface.

It should also be noted that many or even all of the controls accessible through the GUI may also be made available through direct keyboard commands, and even menus, as is customary in most implementations. The description of exemplary embodiments in accordance with the invention is not intended to exclude interfaces expected in an integrated GUI such as keyboard access, menus and forms.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. In a client computer system having a graphical user interface including a display and a pointing device, the computer system being connected to a host computer system, the host computer system sharing an application with the client computer system during data conferencing, and the host computer system controlling an image corresponding to the shared application on the display-device of the client computer system, a method for displaying and manipulating an image corresponding to the shared application on the display-device of the client computer system, the method comprising:

displaying in a top-level frame on the display device of the client computer system, the image corresponding to the shared application, the application being non-responsive to commands issued from the client computer system until the client computer system obtains control of the shared application from the host computer system;

facilitating a plurality of operations, the operations including moving, restoring, minimizing and closing, on said top-level frame by a user of the client computer system; and manipulating the top-level frame of the client computer to reflect a degree of interest and designating the frequency of updates to the image corresponding to the shared application in the frame on the display device of the client computer in accordance with the degree of interest.

2. The method of claim 1 wherein the top-level frame is associated with a plurality of graphical symbols.

3. The method of claim 2 wherein the top-level frame includes a graphical symbol selectable by the pointing device for issuing commands for moving the top-level frame.

4. The method of claim 2 wherein the top-level frame includes a graphical symbol selectable by the pointing device for issuing commands for restoring the top-level frame.

5. The method of claim 2 wherein the top-level frame includes a graphical symbol selectable by the pointing device for issuing commands for minimizing the top-level frame.

6. The method of claim 2 wherein the top-level frame includes a graphical symbol selectable by the pointing device for issuing commands for maximizing the top-level frame.

7. The method of claim 2 wherein the top-level frame includes a graphical symbol selectable by the pointing device for issuing commands for transferring focus.

8. The method of claim 1 wherein the image of the shared application is a fake window.

9. The method of claim 1 wherein the top-level frame includes a graphical symbol selectable by the pointing device for indicating current focus.

10. The method of claim 1 wherein the top-level frame is associated with a fake-taskbar, said fake-taskbar comprising a plurality of buttons corresponding to a plurality of applications being shared.

11. The method of claim 10 wherein a button, corresponding to the shared application, on the fake-taskbar reflects whether the corresponding application is in focus.

12. The method of claim 1 wherein the top-level frame includes a scroll bar.

13. The method of claim 1 wherein the top-level frame is not displayed on a display device of the host.

14. The method of claim 1 wherein a fake-taskbar is displayed on a desktop of the host to indicate applications being shared.

15. The method of claim 1 wherein the top-level frame is partially transparent.

16. The method of claim 1 wherein the top-level frame corresponds to a particular group of applications.

17. The method of claim 1 wherein the graphical functionality accessible through pointing devices are also accessible through keyboard commands.

18. A computer-readable medium having computer-executable instructions for carrying out the steps of displaying and manipulating, on a display device of a client computer having a graphical user interface, an image corresponding to a shared application, said shared application shared by a host, the host in a data conference with the client computer and controlling the image on the client computer, the steps comprising:

displaying a frame on the display device of the client computer; including the image corresponding to the shared application in the frame; manipulating the frame on the display device of the client computer in order to manipulate the image included in the frame;

displaying the image corresponding to the shared application relative to the frame, the application being non-responsive to commands issued from the client computer until the client computer system obtains control of the shared application from the host computer; and manipulating the top-level frame of the client computer to reflect a degree of interest and designating the frequency of updates to the image corresponding to the shared application in the frame on the display device of the client computer in accordance with the degree of interest.

19. The computer-readable medium of claim 18 further having computer-executable instructions wherein the step of displaying the image corresponding to the shared application relative to the frame further includes displaying a fake window corresponding to the shared application in the same relationship to a boundary of the frame as is between a shared application window and a boundary of a desktop of the host.

20. The computer-readable medium of claim 19 further having computer-executable instructions wherein the step of displaying a frame further includes displaying a scroll bar to allow the entire fake window to be accessed by a user of the client computer within the confines of the boundary of the frame.

* * * * *